United States Patent [19]

Englund

[11] 4,176,247
[45] Nov. 27, 1979

[54] SIGNAL SCRAMBLER-UNSCRAMBLER FOR BINARY CODED TRANSMISSION SYSTEM

[75] Inventor: Robert M. Englund, Golden Valley, Minn.

[73] Assignee: Sperry Rand Corporation, New York, N.Y.

[21] Appl. No.: 405,219

[22] Filed: Oct. 10, 1973

[51] Int. Cl.² .............................................. H04L 9/00
[52] U.S. Cl. ......................................... 178/22; 325/32
[58] Field of Search ............................. 178/22; 325/32

[56] References Cited

U.S. PATENT DOCUMENTS

| | | | |
|---|---|---|---|
| 3,515,805 | 6/1970 | Fracassi et al. | 178/22 |
| 3,670,104 | 6/1972 | Abrahamsen | 178/22 |
| 3,784,743 | 1/1974 | Schroeder | 178/22 |

*Primary Examiner*—Howard A. Birmiel

*Attorney, Agent, or Firm*—Kenneth T. Grace; William E. Cleaver; Marshall M. Truex

[57] ABSTRACT

A method and an apparatus for encoding and decoding a binary digital data signal is disclosed. An input signal that is to be encoded for transmission is shifted through a serial shift register with the bits in the stages of the shift register at each of the successive shift periods being used to define a binary coded addressable location in an associated memory. The memory has stored in each of its addressable locations a further binary code that when addressed by the shift register produces, as an output, a binary True or Complement signal which through a True/Complement generator couples the True or the Complement of the input signal to the transmission medium. The receiving end of the transmission medium has a similar arrangement of shift register, memory and True/Complement generator that decodes the received encoded transmitted signal.

11 Claims, 3 Drawing Figures

SIGNAL SCRAMBLER-UNSCRAMBLER FOR BINARY CODED TRANSMISSION SYSTEM

BACKGROUND OF THE INVENTION

Encoding of binary digital data signals for transmission of secret messages is well-known, many special code sequences being used to secure message secrecy. Most systems that pulse code modulate (PCM) secret messages utilize generators of binary sequences that modulate-demodulate the message to be transmitted-received. One generally used generator of binary sequences for coding is a pseudo-random noise generator of pseudo-random (PN) codes—see the E. M. Kartchner, et al., U.S. Pat. No. 3,665,472 for a discussion of such PN codes. In the E. Angeleri, et al., U.S. Pat. No. 3,659,046 there is disclosed a system for scrambling-unscrambling a binary digital data signal using PN codes for data signal security. The present invention is believed to be an improvement over such prior art systems in which it is able to provide greater coding combinations with fewer elements.

SUMMARY OF THE INVENTION

In the present invention both the transmitter and receiver of the input signal that is to be encoded by the transmitter and decoded by the receiver includes three basic elements: a serial shift register of n stages; a memory of $2^n$ addressable locations, each addressable location having a stored binary code that generates a True or a Complement signal when addressed; and a True/Complement generator that encodes/decodes the uncoded/encoded signal.

In the transmitter the input signal is serially shifted through the shift register of n stages. At each shift period the changing n bits of the input signal in the n stages of the shift register define a changing n-bit address of $2^n$ binary combinations. The n-bit address at each shift period defines one of $2^n$ addressable locations in an associated read only memory (ROM) or random access memory (RAM). Each of the $2^n$ addressable locations has stored therein a binary code that produces as an output either a True or a Complement output signal. The input signal and the True/Complement signal are coupled as first and second inputs to an Exclusive OR gate in the True/Complement generator to modulate the input signal for coupling the logical product (Exclusive OR function) of the input signal to the transmission medium. A similar operation is performed at the receiver to decode the received encoded transmitted signal.

BRIEF DESCRIPTION OF THE PREFERRED EMBODIMENT

Figure 1:
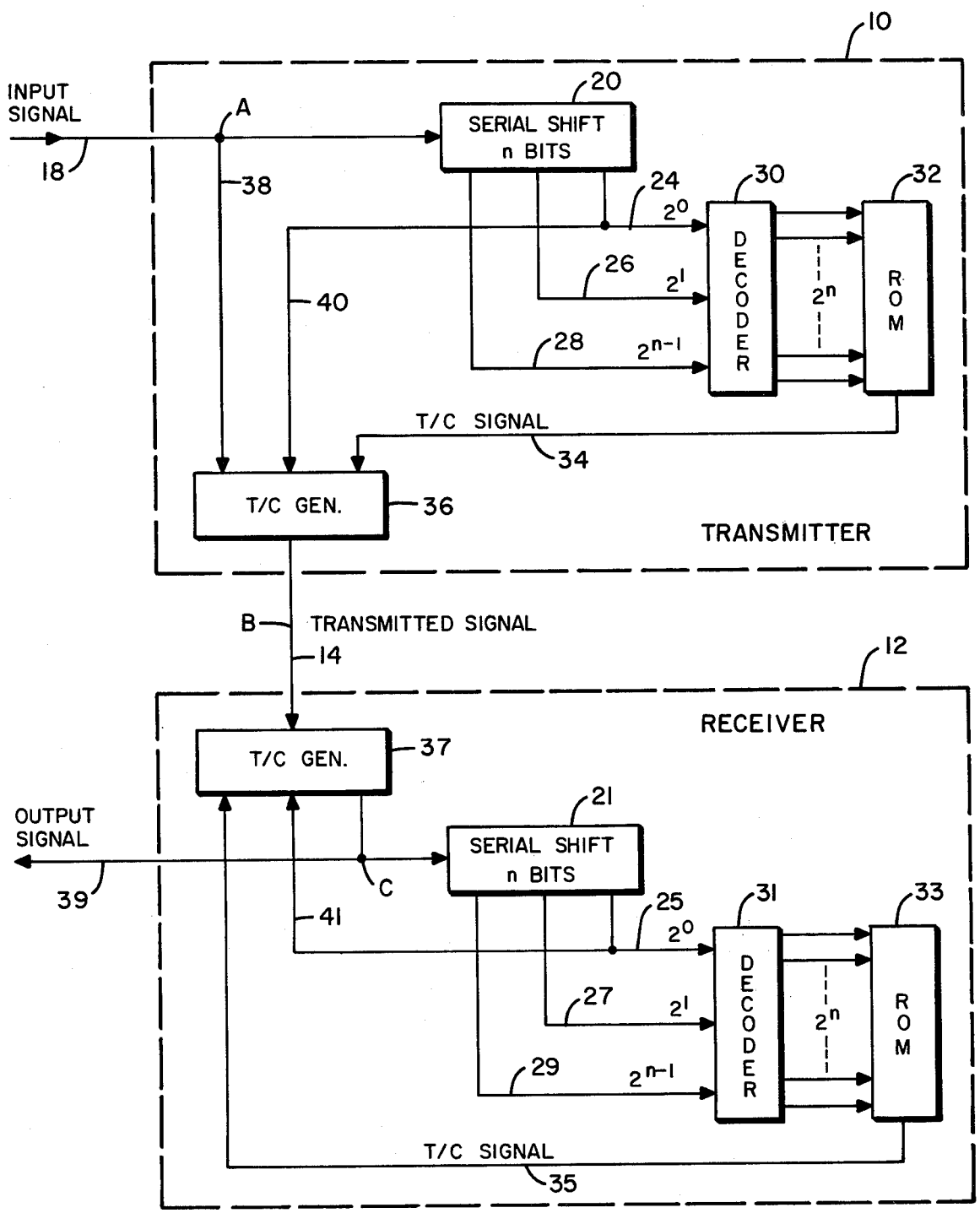
FIG. 1 is a block diagram of the signal scrambler-unscrambler system of the present invention.

With particular reference to FIG. 1 there is presented a block diagram of the signal scrambler-unscrambler system of the present invention consisting of the encoding transmitter 10, decoding receiver 12 and transmission medium 14. Transmitter 10 includes a serial shift register 20 of n bits in length. The input signal to be encoded is received at the lefthand end of shift register 20 from line 18 and node A and is shifted serially through the n stages of shift register 20 from left to right. Thus, at each clock or shift period of the input signal, an n-bit binary combination from the n stages of shift register 20 is coupled to the lines 24, 26, 28 and thence to the decoder 30. Decoder 30 decodes the n-bit address generated by shift register 20 to select one of $2^n$ address lines each of which is uniquely associated with a respectively associated one of the $2^n$ addressable locations of read only memory (ROM) 32. Each of the $2^n$ addressable locations of ROM 32 has stored therein a binary code that produces as an output on line 34 either a True or a Complement output signal which is, in turn, coupled to True/Complement generator 36. Additionally coupled to the True/Complement generator 36 are the input signal from node A by means of line 38 and the righthand or $2^0$ bit position or stage of shift register 20 by means of line 40.

With shift register 20 initially master cleared to contain all 0's the right-most $2^0$ bit position of shift register 20 is utilized by True/Complement generator 36 to detect the shifting of the initial 1 bit of the uncoded input signal into the $2^0$ bit position or right-most stage of shift register 20. This ensures that encoding of the input signal from line 38 is not initiated by True/Complement generator 36 until both shift registers 20 and 21 provide sufficient True address information on lines 24, 26, 28 and 25, 27, 29 to ensure proper decoding addresses for decoder 30 and ROM 32. True/Complement generator 36 provides as its output at node B, which is the transmission medium 14, the True or the Complement of the input signal from node A and line 38 as determined by the True or the Complement output signal from ROM 32 and line 34.

The encoded transmitted signal from transmission medium 14 is, at receiver 12, received at True/Complement generator 37 with the decoded output signal emitted therefrom and coupled to node C from which it is coupled to serial shift register 21 and output line 39. In a manner similar to that of the operation of transmitter 10, the n-bits from the n stages of shift register 21 are, by means of lines 25, 27, 29, coupled to decoder 31 which decodes the n-bit word selecting a selected one of the $2^n$ address lines each of which is uniquely associated with a separate addressable location in ROM 33. As in ROM 32 of transmitter 10, ROM 33 has stored at each of the $2^n$ addresses a binary code that produces as an output therefrom either a True or a Complement output signal which is coupled to line 35 and thence to True/Complement generator 37. Additionally, as in transmitter 10, the righthand or $2^0$ bit position of shift register 21 from line 25 is coupled to True/Complement generator 37 by line 41 to force the output of True/Complement generator 37 at node C to a True condition until such $2^0$ bit position of shift register 21 receives its initial 1 bit of the decoded output signal for the start of the decoding operation upon the encoded transmitted signal received from transmitter 10. Because of the similarity of operation, shift register 20, decoder 30, ROM 32 and True/Complement generator 36 of transmitter 10 are preferably substantially similar to the corresponding items shift register 21, decoder 31, ROM 33 and True/Complement generator 37 of receiver 12.

Figure 2:
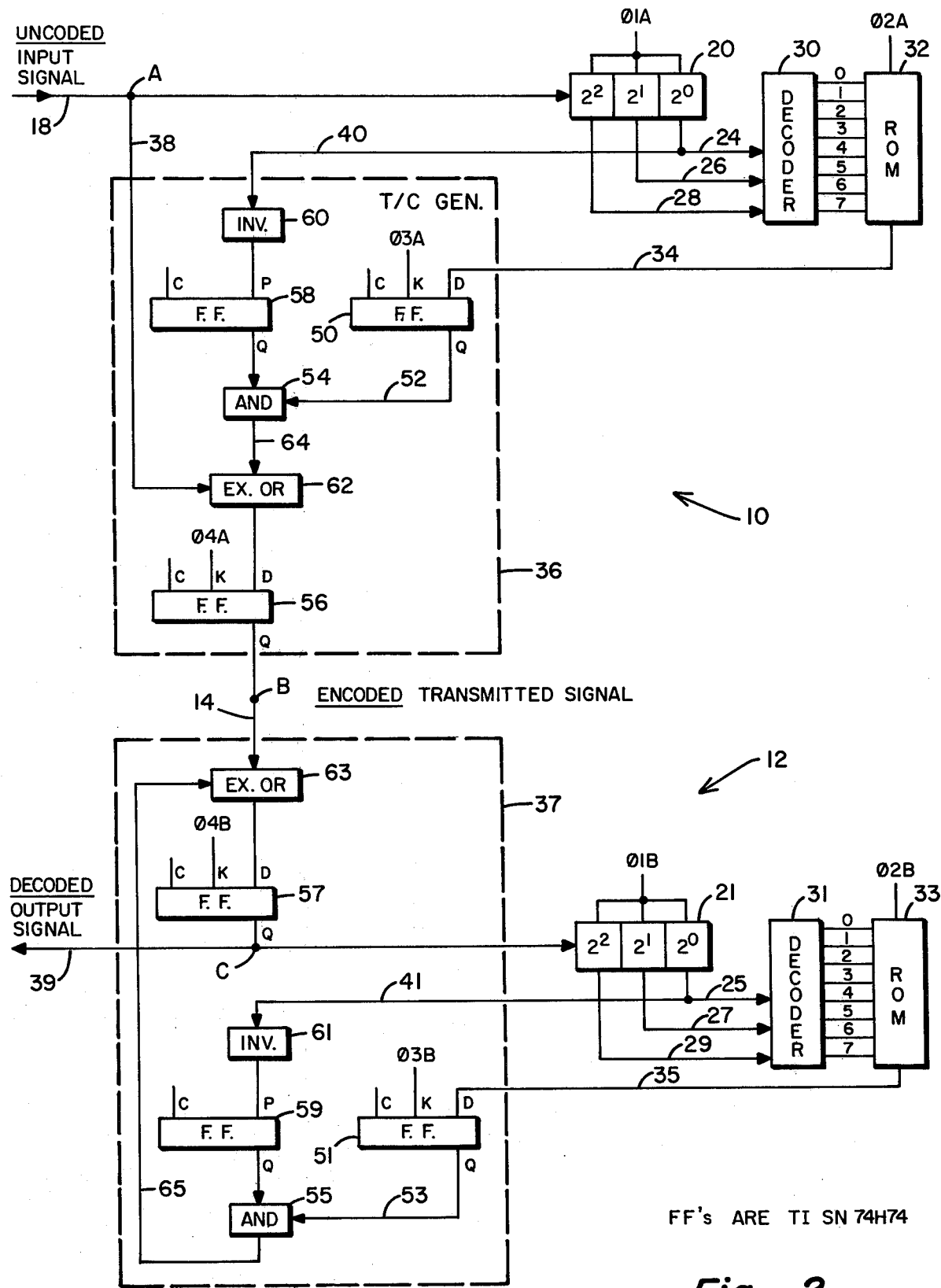
FIG. 2 is a more detailed diagram of the system of FIG. 1.

With particular reference to FIG. 2 there is illustrated a block diagram of the system of FIG. 1 illustrating, at the logic level, one particular implementation of the True/Complement generators 36 and 37. In the embodiment of FIG. 2, shift registers 20, 21 are of 3-bits in length, i.e., n=3, coupling to their associated decoders 30, 31 a 3-bit address word permitting a ROM 32, 33 of eight addressable locations each of which addressable locations has stored therein a 1-bit word, 0 or 1, representative of a True or Complement condition, respectively, for coupling the corresponding True or Complement output signal (i.e., a 0 or a 1) to the associated line 34, 35, respectively. With particular reference to Table A there are illustrated the binary coded contents of each of the 3-bit address words associated with both decoder 30, ROM 32 of transmitter 10 and decoder 31, ROM 33 of receiver 12. As an example, with shift register 20 containing the 3-bit word 010 held in shift register bit positions or stages $2^2$, $2^1$, $2^0$ are coupled by the respectively associated lines 28, 26, 24 to decoder 30, address line 2 is selected. Addressable location 2 of ROM 32 has stored therein the single bit 0 which when selected causes a True output signal to be coupled to line 34 and correspondingly the True of the input signal at node A is coupled to node B. In contrast, when shift register 20 contains the 3-bit address word 100 in the bit positions or stages $2^2$, $2^1$, $2^0$, decoder 30 selects address line 4. With addressable location 4 of ROM 32 storing the single bit 1 it causes a Complement output signal to be coupled to line 34 and correspondingly the Complement of the input signal at node A is coupled to node B. This same operation of shift register 20, decoder 30 and ROM 32 as exemplified by Table A also applies to the operation of shift register 21, decoder 31, ROM 33 of receiver 12.

TABLE A

| ROM Address | ROM Address Line | ROM Address Contents | True/Complement of Signal at Nodes A, B |
|---|---|---|---|
| 000 | 0 | 0 | T |
| 001 | 1 | 1 | C |
| 010 | 2 | 0 | T |
| 011 | 3 | 0 | T |

TABLE A-continued

| ROM Address | ROM Address Line | ROM Address Contents | True/Complement of Signal at Nodes A, B |
|---|---|---|---|
| 100 | 4 | 1 | C |
| 101 | 5 | 0 | T |
| 110 | 6 | 1 | C |
| 111 | 7 | 1 | C |

Figure 3:
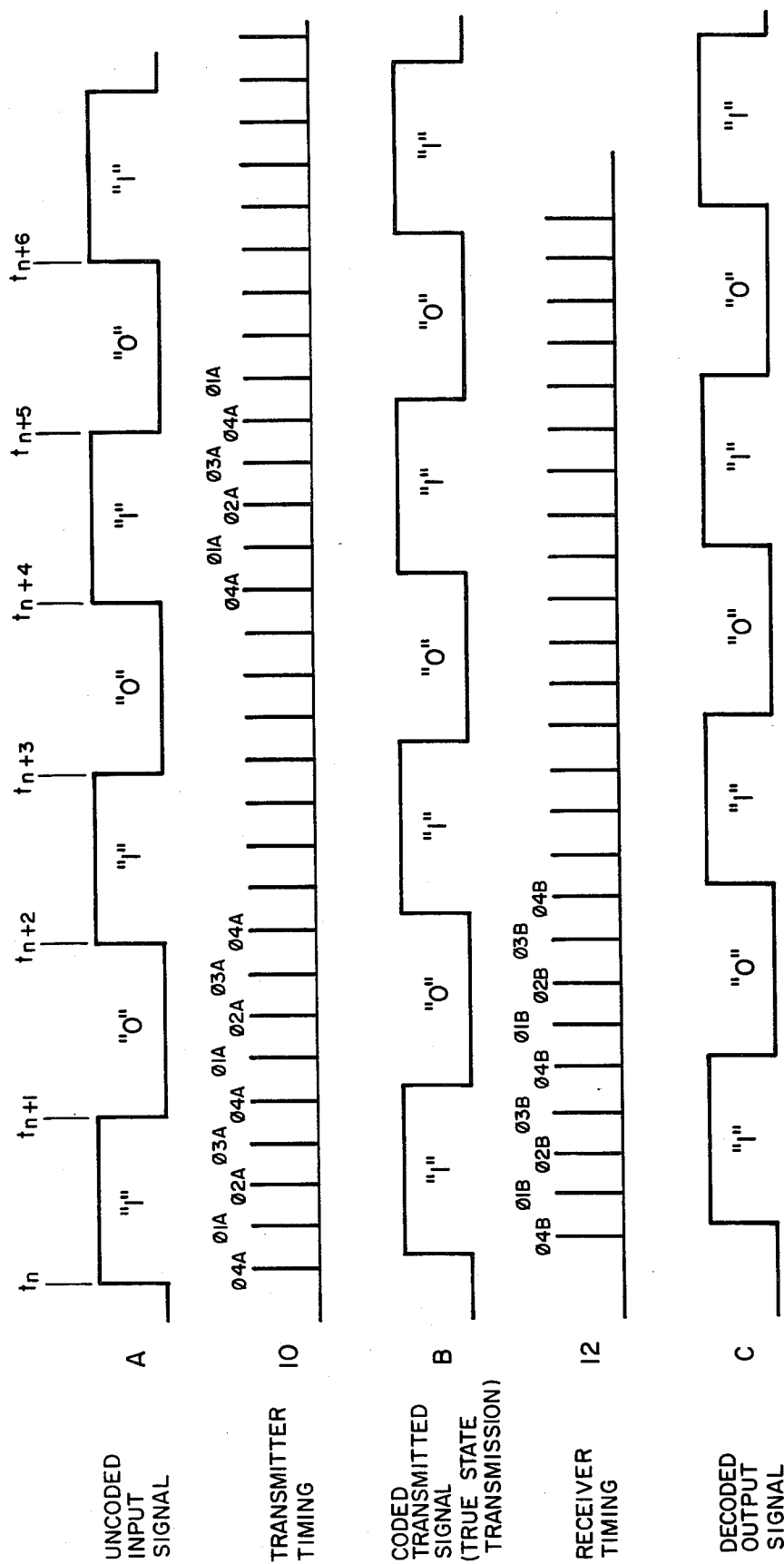
FIG. 3 is an illustration of the relative phase timing diagram relating to FIG. 2.

To aid in further and more detailed discussion of the operation of the systems of FIGS. 1 and 2 there is provided in Table B a detail timing diagram illustrating the manner in which the bits of the uncoded input signal received on line 18 at node A of transmitter 10 are encoded by transmitter 10, transmitted to receiver 12 at node B and then decoded by receiver 12 to emit the decoded output signal from node C on line 39 using the relative phase timing of FIG. 3. In this configuration, for each shift period, e.g., during the period of time each bit of the input signal is coupled to node A, as from time $t_0$ to $t_1$, there is utilized a four phase clocking signal to process each bit of the input signal through the transmitter 10 (and correspondingly receiver 12). As exemplified by FIGS. 2, 3: at phase $\phi 1 A_n$, the bits in shift register 20 are shifted one position or stage to the right while the bit on line 18 and at node A is entered into stage $2^2$; at phase $\phi 2 A_n$, ROM 32 couples its True or Complement output signal via line 34 to Flip-Flop 50 of True/Complement generator 36; at phase $\phi 3 A_n$, Flip-Flop 50 couples its output via line 52 to AND gate 54 and thence via line 64 to Exclusive OR gate 62 of True/Complement generator 36; and at phase $\phi 4 A_n$, Flip-Flop 56 couples its output, the encoded bit of the input signal from node A, to transmission medium 14. Note that as phase $\phi 4 A_n$ occurs after the termination of the associated shift period time $t_n$ the True/Complement encoding by ROM 32 is upon the next subsequent bit at node A. Thus, the contents of shift register 20 immediately after phase $\phi 1 A_n$ of shift period time $t_n$ are used to encode the bit that is coupled to line 18 and node A at the next subsequent shift period time $t_{n+1}$.

TABLE B

| $t_n$ | A | S/R 20 $\phi 1 A_n - \phi 4 A_n$ $2^2 2^1 2^0$ | Ex OR 62 T/C | B | C | S/R 21 $\phi 1 B_n - \phi 4 B_n$ $2^2 2^1 2^0$ | Ex OR 63 T/C | |
|---|---|---|---|---|---|---|---|---|
| 0 | 0 | 0 0 0 | T | 0 | 0 | 0 0 0 | T | |
| 1 | 0 | 0 0 0 | T | 0 | 0 | 0 0 0 | T | Inactive |
| 2 | 0 | 0 0 0 | T | 0 | 0 | 0 0 0 | T | Signal |
| 3 | 0 | 0 0 0 | T | 0 | 0 | 0 0 0 | T | |
| 4 | 1 | 1 0 0 | T | 1 | 1 | 1 0 0 | T | |
| 5 | 0 | 0 1 0 | T | 0 | 0 | 0 1 0 | T | |
| 6 | 1 | 1 0 1 | T | 1 | 1 | 1 0 1 | T | |
| 7 | 0 | 0 1 0 | T | 0 | 0 | 0 1 0 | T | |
| 8 | 1 | 1 0 1 | T | 1 | 1 | 1 0 1 | T | Start |
| 9 | 0 | 0 1 0 | T | 0 | 0 | 0 1 0 | T | Signal |
| 10 | 1 | 1 0 1 | T | 1 | 1 | 1 0 1 | T | |
| 11 | 0 | 0 1 0 | T | 0 | 0 | 0 1 0 | T | |
| 12 | 1 | 1 0 1 | T | 1 | 1 | 1 0 1 | T | |
| 13 | 0 | 0 1 0 | T | 0 | 0 | 0 1 0 | T | |
| 14 | 0 | 0 0 1 | C | 0 | 0 | 0 0 1 | C | |
| 15 | 1 | 1 0 0 | C | 0 | 1 | 1 0 0 | C | |
| 16 | 1 | 1 1 0 | C | 0 | 1 | 1 1 0 | C | |
| 17 | 1 | 1 1 1 | C | 0 | 1 | 1 1 1 | C | |
| 18 | 0 | 0 1 1 | T | 1 | 0 | 0 1 1 | T | |
| 19 | 1 | 1 0 1 | T | 1 | 1 | 1 0 1 | T | |
| 20 | 0 | 0 1 0 | T | 0 | 0 | 0 1 0 | T | Data |
| 21 | 0 | 0 0 1 | C | 0 | 0 | 0 0 1 | C | Signal |
| 22 | 0 | 0 0 0 | T | 1 | 0 | 0 0 0 | T | |
| 23 | 1 | 1 0 0 | C | 1 | 1 | 1 0 0 | C | |
| 24 | 1 | 1 1 0 | C | 0 | 1 | 1 1 0 | C | |
| 25 | 1 | 1 1 1 | C | 0 | 1 | 1 1 1 | C | |
| 26 | 0 | 0 1 1 | T | 1 | 0 | 0 1 1 | T | |

TABLE B-continued

| | | S/R 20 $\phi 1A_n - \phi 4A_n$ | Ex OR 62 | | | S/R 21 $\phi 1B_n - \phi 4B_n$ | Ex OR 63 |
|---|---|---|---|---|---|---|---|
| $t_n$ | A | $2^2 2^1 2^0$ | T/C | B | C | $2^2 2^1 2^0$ | T/C |
| 27 | 1 | 1 0 1 | T | 1 | 1 | 1 0 1 | T |
| 28 | 0 | 0 1 0 | T | 0 | 0 | 0 1 0 | T |
| 29 | 1 | 1 0 1 | T | 1 | 1 | 1 0 1 | T |
| 30 | 1 | 1 1 0 | C | 1 | 1 | 1 1 0 | C |

NOTE:
Ex OR 62, 63 forced True until $2^0 \rightarrow 1$

Initially, with all elements of transmitter 10 and receiver 12 master cleared as at a time prior to a shift period time $t_0$ both registers 20 and 21 contain all 0's in their bit positions $2^2$, $2^1$, $2^0$. Further, assume that the signal to be transmitted will be received on line 18 in the following continuous format:

| ...0000000 | 1010101010 | 011101000111010111011011010111... |
|---|---|---|
| Inactive Signal | Start Signal | Data Signal |

In this assumed format it is assumed that the signal on line 18 is initially inactive transmitting consecutive 0's, that prior to the start of the input signal a 10-bit start signal of alternate 1's and 0's is coupled to line 18 to indicate the subsequent start of data signal transmission on line 14 and that the 10-bit start signal is immediately followed by the data signal.

Referring to the timing diagram of Table B and the relative phase timing diagram of FIG. 3, at the start of shift period time $t_0$ a bit 0 of the inactive signal is, from line 18 and node A, coupled to but not gated into the lefthand stage or bit position $2^2$ of shift register 20 and is also coupled through line 38 as a first input to Exclusive OR gate 62 of True/Complement generator 36. Next at phase $\phi 1A$ (of shift period time $t_0$) this bit 0 of the inactive signal on line 18 is gated into bit position $2^2$ of shift register 20 while the bits previously held in bit positions $2^2$, $2^1$ are shifted one bit position to the right into bit positions $2^1$, $2^0$, respectively. At this time shift register 20 has in its bit positions $2^2$, $2^1$, $2^0$ the 3-bit binary word 000. With the right-most bit position $2^0$ of shift register 20 coupling a 0 to inverter 60 of True/Complement generator 36 a 1 is coupled to the P (Preset) input of Flip-Flop 58 causing the Q output of Flip-Flop 58 to couple a 0 as a first input to AND gate 54 disabling AND gate 54 with respect to the second input from Flip-Flop 50 whose state is determined by the True (0) or Complement (1) output of ROM 32 on line 34.

Now, at this time (phase $\phi 1A$) shift register 20 has in its bit positions $2^2$, $2^1$, $2^0$ the 3-bit binary word 000 whereby at phase $\phi 2A$ ROM 32 couples a True (0) to line 34 and thence to the D (data) input of Flip-Flop 50—see Table A. Then at phase $\phi 3A$ the 0 at the D input of Flip-Flop 50 causes the Q output of Flip-Flop 50 to couple a 0 as a second input to AND gate 54. AND gate 54 on its output line 64 couples the controlling bit to Exclusive OR gate 62 (if the output of AND gate 54 is a 0 the True of the bit on line 38 is coupled to the D input of Flip-Flop 56 while, conversely, if the output of AND gate 54 is a 1 the Complement of the bit on line 38 is coupled to the D input of Flip-Flop 56) whereby the True (0) on line 64 causes, at the start of the next subsequent shift period time $t_1$, the True of the bit 0 on line 38 to be coupled to the D input of Flip-Flop 56. Lastly, at phase $\phi 4A$ the 0 on the D input of Flip-Flop 56 causes the Q output of Flip-Flop 56 to couple a 0 to node B and transmission medium 14. Note that the bit 0 on line 38 that is encoded at phase $\phi 4A$ of shift period time $t_0$ is the bit 0 on line 38 at shift period time $t_1$—see FIG. 3.

Through the successive shift periods of times $t_1 - t_2$ consecutive 0's are gated into and are then shifted from the left to the right in bit positions $2^2$, $2^1$, $2^0$ of shift register 20 whereby the Exclusive OR gate 62 continues coupling consecutive 0's to the D input of Flip-Flop 56 and, accordingly, to node B and transmission medium 14.

At the start of shift period time $t_3$ the last bit 0 of the inactive signal is, from line 18 and node A, coupled to but not gated into the lefthand stage or bit positions $2^2$ of shift register 20 and is also coupled through line 38 as a first input to Exclusive OR gate 62 of True/Complement generator 36. Next, at phase $\phi 1A$ (of shift period time $t_3$) this last bit 0 of the inactive signal on line 18 is gated into bit position $2^2$ of shift register 20 while the bits previously held in bit positions $2^2$, $2^1$ are shifted one bit position to the right into bit positions $2^1$, $2^0$, respectively. At this time shift register 20 has in its bit positions $2^2$, $2^1$, $2^0$ the 3-bit binary word 000. With the right-most bit position $2^0$ of shift register 20 coupling a 0 to inverter 60 of True/Complement generator 36 is 1 is coupled to the P input of Flip-Flop 58 causing the Q output of Flip-Flop 58 to continue coupling a 0 as a first input to AND gate 54 disabling AND gate 54 with respect to the second input from Flip-Flop 50 whose state is determined by the True (0) or Complement (1) output of ROM 32 on line 34.

Now, at this time (phase $\phi 1A$) shift register 20 has in its bit positions $2^2$, $2^1$, $2^0$ the 3-bit binary word 000 whereby at phase $\phi 2A$ ROM 32 couples a True (0) to line 34 and thence to the D input of Flip-Flop 50—see Table A. Then at phase $\phi 3A$ the 0 at the D input of Flip-Flop 50 causes the Q output of Flip-Flop 50 to couple a 0 as a second input to AND gate 54. AND gate 54 on its output line 64 couples the controlling bit to Exclusive OR gate 62 whereby, because AND gate 54 is still disabled by the 0 on the Q output of Flip-Flop 58, the True (0) on line 64 causes the True of the bit 0 on line 38 to be coupled to the D input of Flip-Flop 56. At the start of shift period time $t_4$ the last bit 0 of the inactive signal is changed to the first bit 1 of the start signal such that between phase $\phi 3A$ and phase $\phi 4A$ of shift period time $t_3$ the first bit 1 of the start signal is coupled to the D input of Flip-Flop 56. Lastly, at phase $\phi 4A$ the 1 at the D input of Flip-Flop 56 causes the 0 output of Flip-Flop 56 to couple a 1 to node B and transmission medium 14.

At the start of shift period time $t_4$ the first bit 1 of the 10-bit start signal is, from line 18 and node A, coupled to but not gated into the lefthand stage or bit position $2^2$ of shift register 20 and is also coupled through line 38 as a first input to Exclusive OR gate 62 of True/Complement generator 36. Next, at phase $\phi 1A$ (of shift period time t4) this first bit 1 of the start signal on line 18 is gated into bit position $2^2$ of shift register 20 while the bits previously held in bit positions $2^2$, $2^1$ are shifted one bit position to the right into bit positions $2^1$, $2^0$, respectively. At this time shift register 20 has in its bit positions $2^2$, $2^1$, $2^0$ the 3-bit binary word 100. With the right-most bit position $2^0$ of shift register 20 still coupling a 0 to inverter 60 of True/ Complement generator 36 a 1 is coupled to the P input of Flip-Flop 58 causing the Q output of Flip-Flop 58 to continue coupling a 0 as a first input to AND gate 54 disabling AND gate 54 with respect to the second input from Flip-Flop 50 whose state is determined by the True (0) or Complement (1) output of ROM 32 on line 34.

Now, at this time (phase $\phi$1A) shift register 20 has in its bit positions $2^2$, $2^1$, $2^0$ the 3-bit binary word 100 whereby at phase $\phi$2A ROM 32 couples a Complement (1) to line 34 and thence to the D input of Flip-Flop 50—see Table A. Then at phase $\phi$3A the 1 at the D input of Flip-Flop 50 causes the Q output of Flip-Flop 50 to couple a 1 as a second input to AND gate 54. AND gate 54 on its output line 64 couples the controlling bit to Exclusive OR gate 62 whereby, because AND gate 54 is still disabled by the 0 on the Q output of Flip-Flop 58, the True (0) on line 64 causes, at the start of shift period time t5, the True of the second bit 0 of the start signal on line 38 to be coupled to the D input of Flip-Flop 56. Lastly, at phase $\phi$4A the second bit 0 of the start signal at the D input of Flip-Flop 56 causes the Q output of Flip-Flop 56 to couple a 0 to node B and transmission medium 14.

At the start of shift period time t5 the second bit 0 of the start signal is, from line 18 and node A, coupled to but not gated into the lefthand stage or bit position $2^2$ of shift register 20 and is also coupled through line 38 as a first input to Exclusive OR gate 62 of True/Complement generator 36. Next, at phase $\phi$1A (of shift period time t5) this second bit 0 of the start signal on line 18 is gated into bit position $2^2$ of shift register 20 while the bits held in bit positions $2^2$, $2^1$ are shifted one bit position to the right into bit positions $2^1$, $2^0$, respectively. At this time shift register 20 has in its bit positions $2^2$, $2^1$, $2^0$ the 3-bit binary word 010. With the right-most bit position $2^0$ of shift register 20 still coupling a 0 to inverter 60 of True/Complement generator 36 a 1 is coupled to the D input of Flip-Flop 58 causing the Q output of Flip-Flop 58 to continue coupling a 0 as a first input to AND gate 54 disabling AND gate 54 with respect to the second input from Flip-Flop 50 whose state is determined by the True (0) or the Complement (1) output of ROM 32 on line 34.

Now, at this time (phase $\phi$1A) shift register 20 has in its bit positions $2^2$, $2^1$, $2^0$ the 3-bit binary word 010 whereby at phase $\phi$2A ROM 32 couples a True (0) to line 34 and thence to the D input of Flip-Flop 50—see Table A. Then at phase $\phi$3A the 0 at the D input of Flip-Flop 50 causes the Q output of Flip-Flop 50 to couple a 0 as a second input to AND gate 54. AND gate 54 on its output line 64 couples the controlling bit to Exclusive OR gate 62 whereby, because AND gate 54 is still disabled by the 0 on the Q output of Flip-Flop 58 the True (0) on line 64 causes, at the start of shift period time t6, the True of the third bit 1 of the start signal on line 38 to be coupled to the D input of Flip-Flop 56. Lastly, at phase $\phi$4A the third bit 1 of the start signal at the D input of Flip-Flop 56 causes the Q output of Flip-Flop 56 to couple a 1 to node B and transmission medium 14.

At the start of shift period time t6 the third bit 1 of the start signal is, from line 18 and node A, coupled to but not gated into the lefthand stage or bit position $2^2$ of shift register 20 and is also coupled through line 38 as a first input to Exclusive OR gate 62 of True/Complement generator 36. Next, at phase $\phi$1A (of shift period time t6) this third bit 1 of the start signal on line 18 is gated into bit position $2^2$ of shift register 20 while the bits previously held in bit positions $2^2$, $2^1$ are shifted one bit position to the right into bit positions $2^1$, $2^0$, respectively. At this time shift register 20 has in its bit positions $2^2$, $2^1$, $2^0$ the 3-bit binary word 101. With the right-most bit position $2^0$ of shift register 20 coupling, for the first time, a 1 to inverter 60 of True/Complement generator 36 a 0 is coupled to the P input of Flip-Flop 58 causing the Q output of Flip-Flop 58 to couple a 1 as a first input to AND gate 54 enabling AND gate 54 with respect to the second input from Flip-Flop 50 whose state is determined by the True (0) or Complement (1) output of ROM 32 on line 34.

Now, at this time (phase $\phi$1A) shift register 20 has in its bit positions $2^2$, $2^1$, $2^0$ the 3-bit binary word 101 whereby at phase $\phi$2A ROM 32 couples a True (0) to line 34 and thence to the D input of Flip-Flop 50—see Table A. Then at phase $\phi$3A the 0 at the D input of Flip-Flop 50 causes the Q output of Flip-Flop 50 to couple a 0 as a second input to AND gate 54. AND gate 54 on its output line 64 couples the controlling bit to Exclusive OR gate 62 whereby, because AND gate 54 is enabled for the first time by the 0 on the Q output of Flip-Flop 58, the True (0) on line 64 causes, at the start of shift period time t7, the True of the fourth bit 0 of the start signal on line 38 to be coupled to the D input of Flip-Flop 56. Lastly, at phase $\phi$4A the fourth bit 0 of the start signal at the D input of Flip-Flop 56 causes the Q output of Flip-Flop 56 to couple a 0 to node B and transmission medium 14.

At the start of shift period time t7 the fourth bit 0 of the start signal is, from line 18 and node A, coupled to but not gated into the lefthand stage or bit position $2^2$ of shift register 20 and is also coupled through line 38 as a first input to Exclusive OR gate 62 of True/Complement generator 36. Next, at phase $\phi$1A (of shift period time t7) this fourth bit 0 of the start signal on line 18 is gated into bit position $2^2$ of shift register 20 while the bits previously held in bit positions $2^2$, $2^1$ are shifted one bit position to the right into bit positions $2^1$, $2^0$, respectively. At this time shift register 20 has in its bit positions $2^2$, $2^1$, $2^0$ the 3-bit binary word 010. With the right-most bit position $2^0$ of shift register 20 coupling a 0 to inverter 60 of True/Complement generator 36 a 1 is coupled to the P input of Flip-Flop 58. However, as Flip-Flop 58 was preset during shift period time t6, it remains in its preset condition thereafter (until cleared). Accordingly, the Q output of Flip-Flop 58 will continue to couple a 1 as a first input to AND gate 54 enabling AND gate 54 with respect to the second input from Flip-Flop 50 whose state is determined by the True (0) or Complement (1) output of ROM 32 on line 34.

Now, at this time (phase $\phi$1A) shift register 20 has in its bit positions $2^2$, $2^1$, $2^0$, the 3-bit binary word 010 whereby at phase $\phi$2A ROM 32 couples a True (0) to line 34 and thence to the D input of Flip-Flop 50—see Table A. Then at phase $\phi$3A the 0 at the D input of Flip-Flop 50 causes the Q output of Flip-Flop 50 to couple a 0 as a second input to AND gate 54. AND gate 54 on its output line 64 couples the controlling bit to Exclusive OR gate 62 whereby, because AND gate 54 is still enabled by a 1 on the Q output of Flip-Flop 58, the True (0) on line 64 causes at the start of shift period time t₈ the True of the fifth bit 1 of the start signal on line 38 to be coupled to the D input of Flip-Flop 56. Lastly, at phase φ4A the fifth bit 1 of the start signal at the D input of Flip-Flop 56 causes the Q output of Flip-Flop 56 to couple a 1 to node B and transmission medium 14. Thus, once Flip-Flop 58 is preset by the initial bit 1 of the start signal propagating to bit position $2^0$ of shift register 20 it remains preset coupling a 1 to the first input of AND gate 54 and the True or Complement state of the encoded data at node B is then subsequently controlled by the True or Complement signal from ROM 32 (that is until Flip-Flop 58 is cleared).

At the start of shift period time t₈ the fifth bit 1 of the start signal is, from line 18 and node A, coupled to but not gated into the lefthand stage or bit position $2^2$ of shift register 20 and is also coupled through line 38 as a first input to Exclusive OR gate 62 of True/Complement generator 36. Next, at phase φ1A (of shift period time t₈) this fifth bit 1 of the start signal on line 18 is gated into bit position $2^2$ of shift register 20 while the bits previously held in bit positions $2^2$, $2^1$ are shifted one bit position to the right into bit positions $2^1$, $2^0$, respectively. At this time register 20 has in its bit positions $2^2$, $2^1$, $2^0$ the 3-bit binary word 101. With the right-most bit position $2^0$ of shift register 20 coupling a 1 to inverter 60 of True/Complement generator 36 a 0 is coupled to the P input of Flip-Flop 58. However, as described above Flip-Flop 58 remains preset and continues causing the Q output of Flip-Flop 58 to couple a 1 as a first input to AND gate 54 enabling AND gate 54 with respect to the second input from Flip-Flop 50 whose state is determined by the True (0) or Complement (1) output of ROM 32 on line 34.

Now at this time (phase φ1A) shift register 20 has in its bit positions $2^2$, $2^1$, $2^0$ the 3-bit binary word 101 whereby at phase φ2A ROM 32 couples a True (0) to line 34 and thence to the D input of Flip-Flop 50—see Table A. Then at phase φ3A the 0 at the D input of Flip-Flop 50 causes the Q output of Flip-Flop 50 to couple a 0 as a second input to AND gate 54. AND gate 54 on its output line 64 couples the controlling bit to Exclusive OR gate 62 whereby, because AND gate 54 is still enabled by the 1 on the Q output of Flip-Flop 58, the True (0) on line 64 causes at the start of shift period time t₉ the True of the sixth bit 0 of the start signal on line 38 to be coupled to the D input of Flip-Flop 56. Lastly, at phase φ4A the sixth bit 0 of the start signal at the D input of Flip-Flop 56 causes the Q output of Flip-Flop 56 to couple a 0 to node B and transmission medium 14.

This same operation continues through the shift period times t₉ et seq. whereby the bit positions $2^2$, $2^1$, $2^0$ of shift register 20 are decoded by decoder 20 causing ROM 32 to couple the associated True/Complement signal to line 34 which is the controlling input to AND gate 54 causing Exclusive OR gate 62 to couple to node B the corresponding True/Complement of the sampled bit at node A.

Referring now to receiver 12, the operation of which is similar to that of transmitter 10, the encoded signal from transmitter 10 at node B is coupled as a first input to Exclusive OR gate 63 of True/Complement generator 37, the second input of which is the output of AND gate 55 by means of line 65. As in the above described operation of True/Complement generator 36 of transmitter 10, True/Complement generator 37 of receiver 12 is held in the True state through bit position $2^0$ of shift register 21 and line 41 (until the initial 1 bit at node C is shifted into bit position $2^0$) causing inverter 61 to couple a 1 to the P input of Flip-Flop 59 which, in turn, couples a 0 as a first input to AND gate 55. AND gate 55 is then held in its disabled condition coupling a 0 as the second input to Exclusive OR gate 63 by way of line 65. This causes the True of the encoded signal at node B to pass through Exclusive OR gate 63 and Flip-Flop 57. The Q output of Flip-Flop 57 is coupled to node C and is emitted therefrom on line 39 as the decoded signal and is also coupled to the lefthand stage or bit position $2^2$ of shift register 21. When the initial 1 bit at node C has been shifted through shift register 21 into bit position $2^0$, as at shift period time t₆, inverter 61 is by way of line 41 caused to couple a 0 to the P input of Flip-Flop 59 whereby Flip-Flop 59 is switched into its preset state thereafter coupling a 1 as the enabling first input to AND gate 55. Thereafter, as in the operation of transmitter 10, the True or Complement state of the decoded signal at node C is controlled by the True or Complement output signal from ROM 33 on line 35. Again referring to Table B, it can be seen that the uncoded input signal at node A has been encoded at node B and then emitted at node C as the decoded output signal equal to the uncoded input signal at node A.

Referring back to FIG. 2, it is to be appreciated that shift registers 20 and 21 could be of any length, but must be of sufficient length to provide a binary coded word of the necessary length to accommodate the desired number of addressable locations in ROMs 32 and 33, respectively; and, of course, the bit position in shift registers 20 and 21 that is to be coupled to inverters 60 and 61, respectively, need not be the right-most bit position. As an example, shift registers 20 and 21 could be of 10 and 12 bit positions in length, respectively, with the first, third, fifth and seventh bit positions from the left being used to address ROMs 32 and 33, each of 16 address capacity storing the True in 10 addresses and the Complement in 6 addresses, while the eighth bit position from the left being coupled to inverters 60 and 61. The important feature is that both shift registers 20 and 21 must always contain the True (uncoded or decoded) of the input signal, that like bit positions of shift registers 20 and 21 must be coupled to the like components of transmitter 10 and receiver 12, respectively, and that a given binary coded word in shift registers 20 and 21 must generate like outputs, both True or both Complement, from ROMs 32 or 33, respectively.

What is claimed is:

1. In a transmission system of a binary digital signal, a signal scrambler comprising:
    a shift register having a plurality of bit positions;
    a memory having a plurality of addressable locations for storing the alternative True state or Complement state in each of said addressable locations, each of said stored True or Complement states generating a corresponding True or Complement output when selected by said shift register;
    means responsively coupling said memory to said shift register for selecting one of said addressable locations;
    a True/Complement generator;
    a node A for receiving an uncoded input signal of alternative binary digits of 0 or 1;
    a node B for emitting an encoded transmitted signal of alternative binary digits of 0 or 1;

means coupling said node A to a first bit position of said shift register;

means coupling said node A to said True/Complement generator;

means coupling the True or Complement output of said memory to said True/Complement generator;

means coupling a second bit position of said shift register to said True/Complement generator for forcing said True/Complement generator to couple the True of said uncoded input signal to said node B until said second bit position receives its initial 1 bit from said node A and thereafter forcing said True/Complement generator to couple the True or the Complement of said uncoded input signal to said node B under control of the True or the Complement output of the memory addressable location that is selected by said shift register.

2. In a transmission system of a binary digital signal, a signal unscrambler comprising:

a shift register having a plurality of bit positions;

a memory having a plurality of addressable locations for storing the alternative True state or Complement state in each of said addressable locations, each of said stored True or Complement states generating a corresponding True or Complement output when selected by said shift register;

means responsively coupling said memory to said shift register for selecting one of said addresses;

a True/Complement generator;

a node B for receiving an encoded transmitted signal of alternative binary digits of 0 or 1;

a node C for emitting a decoded output signal of alternative binary digits of 0 or 1;

means coupling said node C to a first bit position of said shift register;

means coupling said node B to said True/Complement generator;

means coupling the True or Complement output of said memory to said True/Complement generator;

means coupling a second bit position of said shift register to said True/Complement generator for forcing said True/Complement generator to couple the True of said encoded transmitted signal to said node C until said second bit position receives its initial 1 bit from said node C and thereafter forcing said True/Complement generator to couple the True or the Complement of said encoded transmitted signal to said node C under control of the True or the Complement output of the memory addressable that is selected by said serial shift register.

3. In a transmission system of a binary digital signal, a signal scrambler comprising:

a serial shift register of n bits in length having the bit positions $2^{n-1}, 2^{n-2}, \ldots 2^0$;

a decoder;

means coupling the bit positions $2^{n-1}, 2^{n-2}, \ldots 2^0$ of said serial shift register to said decoder;

a memory having $2^n$ addressable locations for storing a True state in $(2^n/2)$ of said $2^n$ addressable locations and a Complement state in the other $(2^n/2)$ of said $2^n$ addressable locations;

means coupling the decoded output of said decoder to said memory for selecting only one of said $2^n$ addressable locations as determined by the bits in the bit positions $2^{n-1}, 2^{n-2}, \ldots 2^0$ of said shift register;

a node A for receiving an uncoded input signal of alternative binary digits of 0 or 1;

a node B for emitting an encoded transmitted signal of alternative binary digits of 0 to 1;

means coupling said node A to the bit position $2^{n-1}$ of said serial shift register;

a True/Complement generator comprising;

an inverter;

means coupling the bit position $2^0$ of said serial shift register to the input of said inverter;

a first Flip-Flop having a P input and a Q output;

means coupling the output of said inverter to the P input of said first Flip-Flop;

an AND gate;

means coupling the Q output of said first Flip-Flop as a first input to said AND gate;

a second Flip-Flop having a D input and a Q output;

means coupling the True or Complement output of said memory to the D input of said second Flip-Flop;

means coupling the Q output of said second Flip-Flip as the second input to said AND gate;

and Exclusive OR gate;

means coupling said uncoded input signal at said node A as the first input to said Exclusive OR gate;

means coupling the output of said AND gate as the second input to said Exclusive OR gate;

a third Flip-Flop having a D input and a Q output;

means coupling the output of said Exclusive OR gate to the D input of said third Flip-Flop;

means coupling the Q output of said third Flip-Flop to said node B;

the bit in the bit position $2^0$ of said serial shift register forcing said True/Complement generator to couple the True of said uncoded input signal to said node B until the bit position $2^0$ of said serial shift register receives its initial 1 bit from said node A and thereafter forcing said True/Complement generator to couple the True or the Complement of said uncoded input signal to said node B under control of the True or the Complement content of the addressable location selected by said decoder and the contents of the bit positions $2^{n-1}, 2^{n-2}, \ldots 2^0$ of said serial shift register.

4. In a transmission system of a binary digital signal, a signal unscrambler comprising:

a serial shift register of n bits in length having the bit positions $2^{n-1}, 2^{n-2}, \ldots 2^0$;

a decoder;

means coupling the bit positions $2^{n-1}, 2^{n-2}, \ldots 2^0$ of said serial shift register to said decoder;

a memory having $2^n$ addressable locations for storing a True state in $(2^n/2)$ of said $2^n$ addressable locations and a Complement state in the other $(2^n/2)$ of said $2^n$ addressable locations;

means coupling the decoded output of said decoder to said memory for selecting only one of said $2^n$ addressable locations as determined by the bits in the bit positions $2^{n-1}, 2^{n-2}, \ldots 2^0$ of said shift register;

a node B for receiving an encoded transmitted signal of alternative binary digits of 0 or 1;

a node C for emitting a decoded output signal of alternative binary digits of 0 or 1;

means coupling said node C to the bit position $2^{n-1}$ of said serial shift register;

a True/Complement generator comprising;

an inverter;

means coupling the bit position $2^0$ of said serial shift register to the input of said inverter;

a first Flip-Flop having a P input and a Q output;

means coupling the output of said inverter to the P input of said first Flip-Flop;

an AND gate;

means coupling the Q output of said first Flip-Flop as a first input to said AND gate;

a second Flip-Flop having a D input and a Q output;

means coupling the True or Complement output of said memory to the D input of said second Flip-Flop;

means coupling the Q output of said second Flip-Flop as the second input to said AND gate;

an Exclusive OR gate;

means coupling said encoded transmitted signal at said node B as the first input to said Exclusive OR gate;

means coupling the output of said AND gate as the second input to said Exclusive OR gate;

a third Flip-Flop having a D input and a Q output;

means coupling the output of said Exclusive OR gate to the D input of said third Flip-Flop;

means coupling the Q output of said third Flip-Flop to said node C;

the bit in the bit position $2^0$ of said serial shift register forcing said True/Complement generator to couple the True of said encoded transmitted signal to said node C until the bit position $2^0$ of said serial shift register receives its initial 1 bit from said node C and thereafter forcing said True/Complement generator to couple the True or the Complement of said encoded transmitted signal to said node C under control of the True or the Complement content of the addressable location selected by said decoder and the contents of the bit positions $2^{n-1}, 2^{n-2}, \ldots 2^0$ of said serial shift register.

5. In a transmission system of a binary digital signal, a signal scrambler/unscrambler comprising:

a node A for receiving an uncoded input signal;

an encoding transmitter and a decoding receiver coupled by a transmission medium;

said encoding transmitter comprising;

a serial shift register of n bits in length having the bit positions $2^{n-1}, 2^{n-2}, \ldots 2^0$, and responsively coupled to said node A for storing the bits of said uncoded input signal therein;

a memory having $2^n$ addressable locations for storing the alternative True or Complement state in each of said $2^n$ addressable locations;

a decoder coupled to the bit positions $2^{n-1}, 2^{n-2}, \ldots 2^0$ of said serial shift register and to said memory for decoding the binary coded word formed by the bits of said uncoded input signal stored in the respective bit positions $2^{n-1}, 2^{n-2}, \ldots 2^0$ of said serial shift register and selecting the one addressable location in said memory as determined by said binary coded word, said one selected addressable location generating an associated True or Complement output;

a True/Complement generator including means responsively coupled to the bit position $2^0$ of said serial shift register, to the True or Complement output of said memory and to said uncoded input signal at said node A for coupling the True of said uncoded input signal to said transmission medium until the bit position $2^0$ of said serial shift register receives its initial 1 bit of said uncoded input signal and thereafter coupling the True or the Complement of said uncoded input signal to said transmission medium when effected by said True or Complement output of said memory.

6. In the transmission system of claim 5, said decoding receiver comprising:

a node C for emitting a decoded output signal that is identical to said uncoded input signal;

a serial shift register of n bits in length having the bit positions $2^{n-1}, 2^{n-2}, \ldots 2^0$, and responsively coupled to said node C for storing the bits of said decoded output signal therein;

a memory having $2^n$ addressable locations for storing the alternative True or Complement state in each of said $2^n$ addressable locations;

a decoder coupled to the bit positions $2^{n-1}, 2^{n-2}, \ldots 2^0$ of said serial shift register and to said memory for decoding the binary coded word formed by the bits of the decoded output signal stored in the respective bit positions $2^{n-1}, 2^{n-2}, \ldots 2^0$ of said serial shift register and selecting the one addressable location in said memory as determined by said binary coded word, said one selected addressable location generating an associated True or Complement output;

a True/Complement generator including means responsively coupled to the bit position $2^0$ of said serial shift register; to the True or Complement output of said memory and to said encoded transmitted signal on said transmission medium for coupling the True of said encoded transmitted signal to said node C until the bit position $2^0$ of said serial shift register receives its initial 1 bit of said encoded transmitted signal and thereafter coupling the True or the Complement of said encoded transmitted signal to said node C when effected by said True or Complement output of said memory.

7. In a transmission system of a binary digital signal, a signal scrambler comprising:

a serial shift register of n bits in length having the bit positions $2^{n-1}, 2^{n-2}, \ldots 2^0$;

a decoder;

means coupling the bit positions $2^{n-1}, 2^{n-2}, \ldots 2^0$ of said serial shift register to said decoder;

a memory having $2^n$ addressable locations for storing the alternative True state or Complement state in said $2^n$ addressable locations;

means coupling the decoded output of said decoder to said memory for selecting one of said $2^n$ addressable locations as determined by the bits in the bit positions $2^{n-1}, 2^{n-2}, \ldots 2^0$ of said shift register, said selected one addressable location generating a True or a Complement output;

a True/Complement generator;

a node A for receiving an uncoded input signal of continuous alternative binary digits of 0 or 1;

a node B for emitting an encoded transmitted signal of continuous alternative binary digits of 0 or 1;

means coupling said node A to the bit position $2^{n-1}$ of said shift register;

means coupling said node A to said True/Complement generator;

means coupling the True or the Complement output of said memory to said True/Complement generator;

means coupling the bit position $2^0$ of said serial shift register to said True/Complement generator for forcing said True/Complement generator to couple the True of said uncoded input signal to said node B until the bit position $2^0$ of said shift register receives its initial 1 bit from said node A and thereafter forcing said True/Complement generator to couple the True or the Complement of said uncoded input signal to said node B under control of the changing True or Complement outputs of the addressable locations that are selected by said decoder and the changing contents of the bit positions $2^{n-1}, 2^{n-2}, \ldots 2^0$ of said serial shift register as said uncoded input signal sequentially shifts through said shift register in the ordered bit positions $2^{n-1}, 2^{n-2}, \ldots 2^0$.

8. In a transmission system of a binary digital signal, a signal scrambler comprising:

a serial shift register of n bits in length having the bit positions $2^{n-1}, 2^{n-2}, \ldots 2^0$;

a decoder;

means coupling the bit positions $2^{n-1}, 2^{n-2}, \ldots 2^0$ of said serial shift register to said decoder;

a memory having $2^n$ addressable locations for storing the alternative True or Complement state in each of said $2^n$ addressable locations, each of said stored True or Complement states generating a corresponding True or Complement output when selected by said decoder;

means coupling the decoded output of said decoder to said memory for selecting only one of said $2^n$ addressable locations as determined by the bits in the bit positions $2^{n-1}, 2^{n-2}, \ldots 2^0$ of said shift register;

a True/Complement generator;

a node A for receiving an uncoded input signal of alternative binary digits of 0 or 1;

a node B for emitting an encoded transmitted signal of alternative binary digits of 0 or 1;

means coupling said node A to the bit position $2^{n-1}$ of said shift register;

means coupling said node A to said True/Complement generator;

means coupling the True or the Complement output of said memory to said True/Complement generator;

means coupling only the bit position $2^0$ of said shift register to said True/Complement generator for forcing said True/Complement generator to couple the True of said uncoded input signal to said node B until the bit position $2^0$ of said shift register receives its initial 1 bit from said node A and thereafter forcing said True/Complement generator to couple the True or the Complement of said uncoded input signal to said node B under control of the True or the Complement output of the addressable location selected by said decoder and the contents of the bit positions $2^{n-1}, 2^{n-2}, \ldots 2^0$ of said serial shift register.

9. In a transmission system of a binary digital signal, a signal unscrambler comprising:

a serial shift register of n bits in length having the bit positions $2^{n-1}, 2^{n-2}, \ldots 2^0$;

a decoder;

means coupling the bit positions $2^{n-1}, 2^{n-2}, \ldots 2^0$ of said serial shift register to said decoder;

a memory having $2^n$ addressable locations for storing the alternative True or Complement state in each of said $2^n$ addressable locations, each of said stored True or Complement states generating a corresponding True or Complement output when selected by said decoder;

means coupling the decoded output of said decoder to said memory for selecting only one of said $2^n$ addressable locations as determined by the bits in the bit positions $2^{n-1}, 2^{n-2}, \ldots 2^0$ of said serial shift register;

a True/Complement generator;

a node B for receiving an encoded transmitted signal of alternative binary digits of 0 or 1;

a node C for emitting a decoded output signal of alternative binary digits of 0 or 1;

means coupling said node C to the bit position $2^{n-1}$ of said shift register;

means coupling said node B to said True/Complement generator;

means coupling the True or the Complement output of said memory to said True/Complement generator;

means coupling only the bit position $2^0$ of said serial shift register to said True/Component generator for forcing said True/Complement generator to couple the True of said encoded transmitted signal to said node C until the bit position $2^0$ of said serial shift register receives its initial 1 bit from said node C and therafter forcing said True/Complement generator to couple the True or the Complement of said encoded transmitted signal to said node C under control of the True or the Complement output of the addressable location selected by said decoder and the contents of the bit positions $2^{n-1}, 2^{n-2}, \ldots 2^0$ of said serial shift register.

10. In a transmission system of a binary digital signal:

a node A for receiving an uncoded input signal of alternative binary digits of 0 or 1;

an inverter;

register means for coupling said uncoded input signal from said node A to the input of said inverter;

a first Flip-Flop having a plurality of inputs and outputs;

means for coupling the output of said inverter to a first input of said first Flip-Flop;

an AND gate;

means for coupling a first output of said first Flip-Flop as a first input to said AND gate;

a second Flip-Flop having a plurality of inputs and outputs;

means responsively coupled to said register means for generating a True or a Complement output signal;

means for coupling said True or Complement output signal as a first input to said second Flip-Flop;

means for coupling a first output of said second Flip-Flop as the second input to said AND gate;

an Exclusive OR gate;

means for coupling said uncoded input signal at said node A as the first input to said Exclusive OR gate;

means for coupling the output of said AND gate as the second input to said Exclusive OR gate;

a third Flip-Flop having a plurality of inputs and outputs;

means for coupling the output of said Exclusive OR gate to a first input of said third Flip-Flop;

a node B for emitting an encoded transmitted signal of alternative binary digits of 0 or 1;

means for coupling a first output of said third Flip-Flop to said node B;

said uncoded input signal at said inverter disabling said AND gate for forcing said Exclusive OR gate to couple the True of said uncoded input signal to said node B until the initial 1 bit of said uncoded input signal at said inverter enables said AND gate for coupling the True or the Complement of said uncoded input signal to said node B when said Exclusive OR gate is effected by said True or Complement output signal, respectively.

11. In a transmission system of a binary digital signal:

a node B for receiving an encoded transmitted signal of alternative binary digits of 0 to 1;

a node C for emitting a decoded output signal of alternative binary digits of 0 L to 1;

an inverter;

register means for coupling said decoded output signal from said node C to the input of said inverter;

a first Flip-Flop having a plurality of inputs and outputs;

means for coupling the output of said inverter to a first input of said first Flip-Flop;

an AND gate;

means for coupling a first output of said first Flip-Flop as a first input to said AND gate;

a second Flip-Flop having a plurality of inputs and outputs;

means responsively coupled to said register means for generating a True or a Complement output signal;

means for coupling said True or Complement output signal as a first input to said second Flip-Flop;

means for coupling a first output of said second Flip-Flop as the second input to said AND gate;

an Exclusive OR gate;

means for coupling said encoded transmitted signal at said node B as the first input to said Exclusive OR gate;

means for coupling the output of said AND gate as the second input to said Exclusive OR gate;

a third Flip-Flop having a plurality of inputs and outputs;

means for coupling the output of said Exclusive OR gate to a first input of said third Flip-Flop;

means for coupling a first output of said third Flip-Flop to said node C;

said decoded output signal from said node C and said register means at said inverter disabling said AND gate for forcing said Exclusive OR gate to couple the True of said encoded transmitted signal to said node C until the initial 1 bit of said decoded output signal from said node C and said register means at said inverter enables said AND gate for coupling the True or the Complement of said encoded transmitted signal to said node C when said Exclusive OR gate is effected by said True or Complement output signal, respectively.

* * * * *

UNITED STATES PATENT AND TRADEMARK OFFICE
CERTIFICATE OF CORRECTION

PATENT NO. : 4,176,247
DATED : November 27, 1979
INVENTOR(S) : Robert M. Englund It is certified that error appears in the above-identified patent and that said Letters Patent are hereby corrected as shown below:

Column 11, Line 50, delete "memory".
Line 51, after "addressable" insert --location--.

Column 12, Line 4, "0 to 1" should be -- 0 or 1 --.

Column 16, Line 27, "True/Component" should be
-- True/Complement --.

Column 17, Line 16, "0 to 1" should be -- 0 or 1 --.
Line 18, "0 L to 1" should be -- 0 or 1 --.

Signed and Sealed this

Fourth Day of March 1980

[SEAL]

Attest:

SIDNEY A. DIAMOND

Attesting Officer  Commissioner of Patents and Trademarks